United States Patent [19]

O'Connor

[11] 4,066,024
[45] Jan. 3, 1978

[54] ROTATING FLUIDIZED BED COMBUSTOR

[76] Inventor: Chadwell O'Connor, 2024 Galaxy Drive, Newport Beach, Calif. 92660

[21] Appl. No.: 644,127

[22] Filed: Dec. 24, 1975

[51] Int. Cl.² .................... F23G 5/06; F23D 19/02
[52] U.S. Cl. ..................................... 110/8 F; 110/10; 110/14; 201/12
[58] Field of Search ............... 432/103, 118; 110/8 R, 110/8 F, 14, 10; 201/12, 31, 32, 33, 34, 216, 131

[56] References Cited

U.S. PATENT DOCUMENTS

| | | | |
|---|---|---|---|
| 1,573,824 | 2/1926 | Griffiths | 201/12 |
| 2,104,040 | 1/1938 | Hurt | 110/14 |
| 2,175,300 | 10/1939 | Moreton | 110/14 |
| 3,616,266 | 10/1971 | Hall et al. | 201/12 |
| 3,822,651 | 7/1974 | Harris et al. | 110/14 |
| 3,838,015 | 9/1974 | Buchbinder et al. | 202/216 |
| 3,882,801 | 5/1975 | Bolle | 110/14 |

*Primary Examiner*—Kenneth W. Sprague
*Attorney, Agent, or Firm*—Leydig, Voit, Osann, Mayer & Holt, Ltd.

[57] ABSTRACT

A heated fluidized bed is formed by rotating a body of sand in a horizontal cylindrical drum, lifting and dropping sand from the bed through the open portion of the drum, and heating the region through which the sand drops. The drum is formed by a cylindrical water wall of pipes connected to a water source and a steam outlet, and annular end plates hold the sand bed and define inlet and outlet openings in the drum. Waste material is simply dumped through the inlet opening and ash is automatically discharged through the outlet opening. The sand is preferably lifted by small cross section, scoop-like baffles so that the coolest sand from the bottom of the bed is heated, and waste particles are not removed from the bed. If desired, auxiliary air can be introduced into the sand bed through a manifold-pipe arrangement.

7 Claims, 5 Drawing Figures

ROTATING FLUIDIZED BED COMBUSTOR

This invention relates generally to incinerators and more particularly concerns a fluidized bed type of combustor.

The theoretical advantages of pyrolysis "burning" for waste disposal have long been recognized. A fluidized bed incinerator, charged with sand kept in a fluidized state by the flow of air or oxygen and a combustible gas, will completely consume most burnable materials at a temperature of about 1700° F., thereby generating little noxious gas or other pollutants in the discharged stack gas. Such incinerators are, however, expensive since typically they use special heat resistant chambers that must be sealed against inside pressure, require a constant flow of gas, and embody mechanical, positive feed devices for the waste. Moreover, such incinerators normally do not efficiently recover the heat energy generated and require expensive maintenance to restore the heating chamber and clean it of scrap metal and other non-reduceable waste.

It is the primary aim of the invention to provide a combustor that will consume materials by pyrolysis in a kind of fluidized bed, but which is substantially less expensive to build and operate than a conventional fluidized bed incinerator. In more detail, the combustor of the invention requires no fluidizing gas flow, no special waste feed arrangement, no gas-tight sealing and, moreover, efficiently recovers the energy of combustion in the form of steam.

Another object of the invention is to provide a combustor of the above character that does not utilize refractory materials, thereby reducing both the initial cost of the unit and the expenses of maintenance.

A further object is to provide a combustor of the kind characterized above whose design is quite flexible in the sense that the size of the unit can be readily proportioned to the intended use; it being equally feasible to design such a combustor to accept entire tree stumps as to design a small unit for shipboard or small hospital use.

A resulting object is to provide a fluidized bed combustor that can economically accomplish pollution-free disposal of such things as lumbering waste products, shipboard oil sludges, contaminated hospital paper waste, and similar hard-to-dispose-of waste products.

Other objects and advantages of the invention will become apparent upon reading the following detailed description and upon reference to the drawings, in which.

Figure 1:
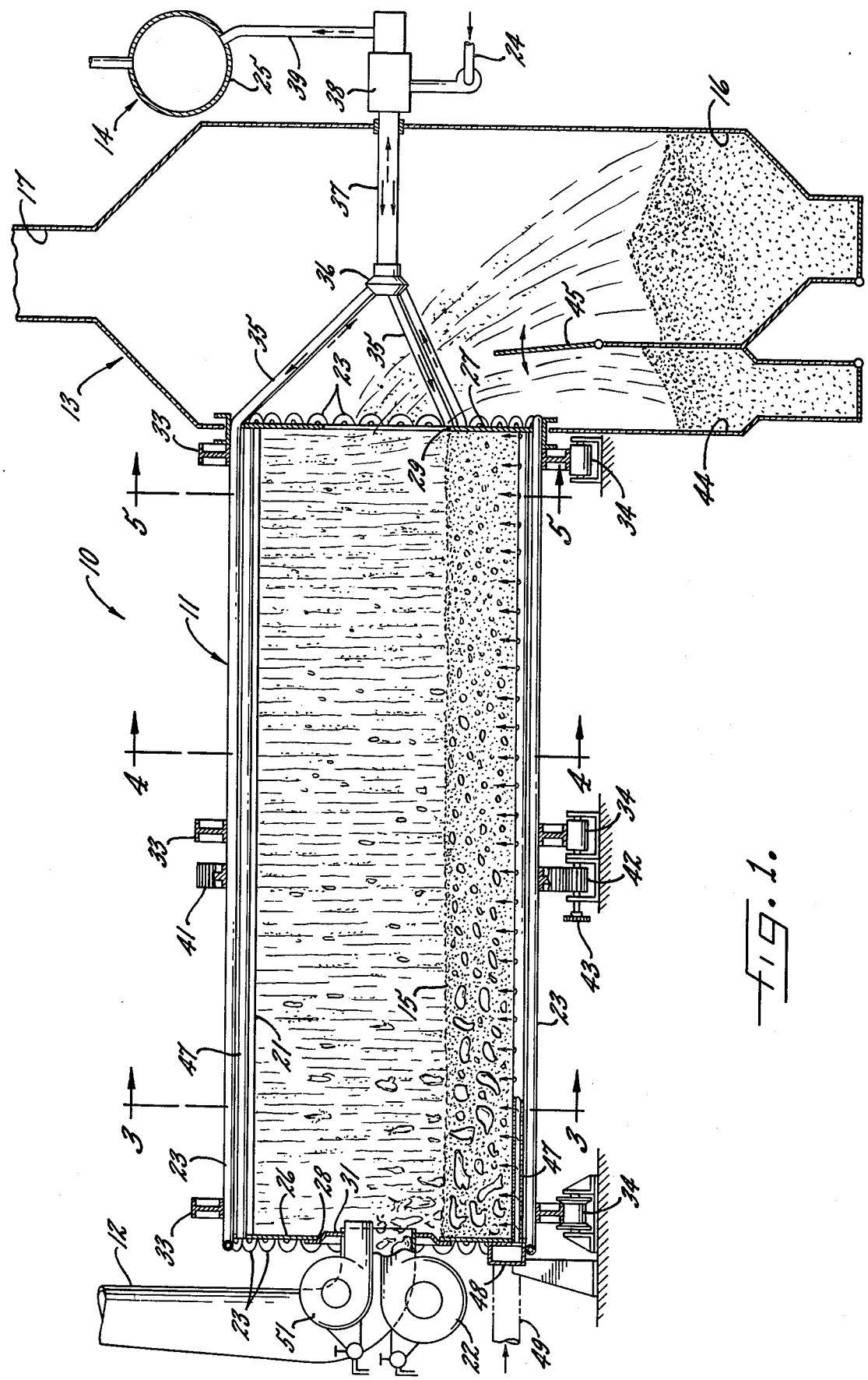
FIG. 1 is a longitudinal vertical section, partially schematic, of a system using a combustor of the present invention.
Figure 2:
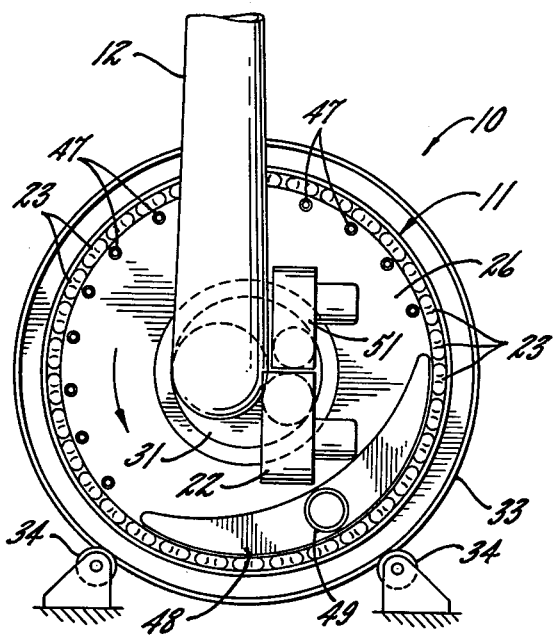
FIG. 2 is an end elevation of the combustor shown in FIG. 1.
Figure 3:
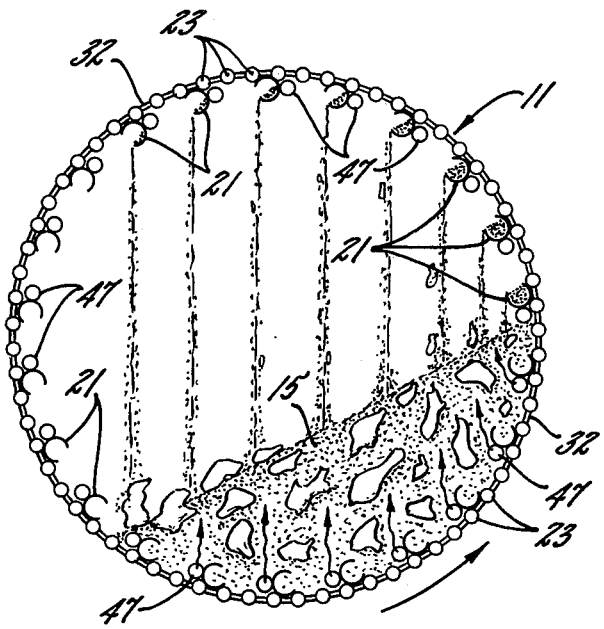
Figure 4:
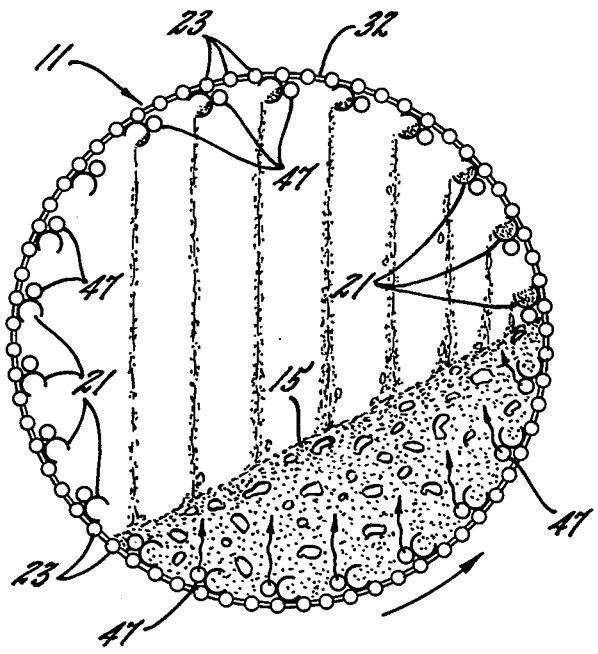
Figure 5:
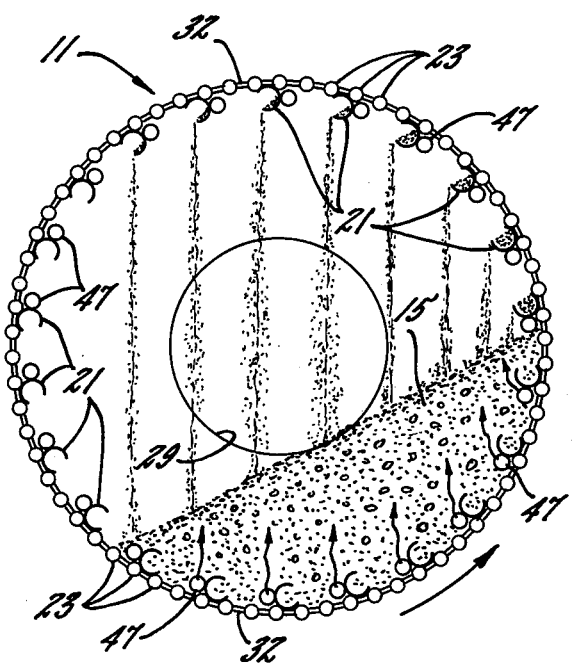

FIGS. 3, 4 and 5 are slightly enlarged sections taken approximately along the lines 3, 4 and 5 in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown a combustor 10 embodying the invention and including a drum 11, a waste input chute 12, an ash and stack gas chamber 13, and steam and water connections 14 illustrated schematically. In operation, burnable waste material is simply dropped through the chute 12, becomes embedded in a fluidized bed of heated sand 15 in the drum 11, is gradually forced from left to right as seen in FIG. 1 while being consumed by pyrolysis, and the resulting ash is received in a pit 16 and stack gas is discharged through a stack 17.

In accordance with one aspect of the invention, the fluidized heated sand bed 15 is created by rotating a charge of sand in the substantially horizontally disposed cylindrical drum 11, and by lifting and dropping sand from the bed through the open portion of the drum which is heated. The sand thus tends to be carried up one side of the drum to an approximate surface angle of 30° (see FIGS. 3–5), whereupon the sand tumbles back "downhill" producing a continuous rolling motion of the bed 15 not unlike the fluidizing effect achieved by forcing air or other gas up through a sand bed. A drum rotational speed on the order of 3 rpm is satisfactory to produce the desired effect.

The sand is lifted and dropped by baffles 21 running longitudinally on the inside of the drum 11 which, in effect, sweep through the sand bed as the drum rotates, lift the sand from the bed, and then drop the sand through the open region of the drum as the baffles rotate over the bed. The sand is initially heated by the flame from a gas fired burner 22, but once pyrolysis starts, gases from the waste material being consumed will be burned off just above the surface of the bed 15 so that the bed will be self-heating with the burner 22 serving as a kind of pilot light.

In accordance with another aspect of the invention, the drum is formed by a cylindrical water wall of adjacent pipes 23 communicating with a source of water 24 and an outlet for steam shown here as a steam chest 25. The drum 11 has annular end plates 26 and 27 holding the ends of the sand bed 15 and defining inlet and outlet openings 28 and 29, respectively. The chute 12 and the burner 22 pass through the inlet opening 28 which is otherwise closed by a cover 31 to minimize heat loss although there is no need for sealing the openings 28, 29.

The water wall is preferably formed by the pipes 23 being accordion bent with adjacent runs being connected by joining ribs 32, as in a conventional boiler water wall, although the drum 11 wall is curved into a cylinder and held by a plurality of circular I-beam bands 33 fitted on supporting rollers 34 much like the water cooled kiln shown in U.S. Pat. No. 3,822,651, issued July 9, 1974. However, an important distinction of the water wall of the drum 11 over the kiln shown in the patent referred to is that the drum 11 is imperforate.

In the illustrated drum, three accordion folded sections of pipe are provided, each spanning 120° of the cylinder's periphery, and each section ends in lengths of feeder pipes 35 leading to a manifold fitting 36 and a concentric, inner and outer path, conduit 37 leading to a joint 38 allowing relative rotation between the drum 11, feeder pipe 35 and conduit 37, and pipes 39 connecting the joint 38 to the water source 24 and the steam chest 25. The joint 38 is a conventional subassembly, and one form of double path conduit and rotating joint is disclosed in some detail in U.S. Pat. No. 3,822,651 previously referred to.

For rotating the drum 11, a ring gear 41 fixed to the periphery of the drum is driven by a pinion 42 powered through a chain 43 from any suitable source of power. If desired, a separate sand pit 44 can be opened by a positionable cover 45 to separate, for reuse, from the ash discharge what little sand spills through the outlet opening 29. Although the water wall will recover most of the heat of combustion in the form of steam, while keeping the drum well below destructive temperatures without the need for refractories, it is also possible to use a simple waste heat boiler, not shown, in the stack 17.

As a feature of the invention, the baffle 21 has small, arcuate cross sections defining elongated scoops that scoop out the sand from the bottom of the bed, which sand will be the coolest, for lifting and reheating. The small scoop sections, being quickly filled with sand, do not lift appreciable amounts of the waste materials being consumed so that the waste is left embedded for pyrolysis consumption.

Another feature of the invention is the provision of pipes 47 and a manifold 48 for introducing air up through the bed 15 to help reduce especially difficult-to-burn waste. The pipes 47 are perforated and fixed behind the baffles 21 with the pipe ends opening through the inlet end plate 26. The manifold 48 is arcuate and approximates the expected cross section of the bed when the combustor is in operation, so that air from a source 49 is distributed by the manifold 48 to those pipes then within the bed 15. When such air is introduced, the effect is virtually identical to a conventional fluidized bed incinerator although the air flow, not being needed for the fluidizing action, may be substantially less. Another blower 51 for introducing still additional air is fitted through the inlet opening cover 31.

The advantages of the combustor 10 can be quickly appreciated by those skilled in the art. Pyrolysis consumption of waste material is achieved in a kind of fluidized bed with no need for the generation and introduction of a fluidizing gas flow or the maintenance of a sealed burning chamber. The waste material is simply dumped in with no need for a complicated feed arrangement, and the resulting ash, being lighter than the sand bed, inherently floats out of the outlet opening 29. The combustor itself is essentially a pipe-formed drum which can be economically made and which does not require refractory materials that are particularly expensive to both assemble and maintain. The heat of combustion is efficiently recovered in the form of steam and it has been noted that in many possible applications for the combustor 10, such as in the lumber industry, on shipboard, or in hospitals, there is a direct need for steam by adjacent equipment. It can also be appreciated that the combustor 10 can vary widely in size and hence capacity, and thus it is quite feasible to design a small compact unit for efficiently disposing of contaminated waste in a small hospital, or to build a much larger unit intended to dispose of forest waste in a large-scale lumbering operation.

The burner 22, auxiliary air blower 51, and pipes 47 and manifold 48, give considerable flexibility to operation of the combustor.

I claim as my invention:

1. A rotary fluidized bed combustor comprising, in combination, a cylindrical drum mounted for rotation about its axis with said axis being substantially horizontal, said drum having annular end plates defining inlet and outlet openings, a charge of sand in said drum defining a bed extending between said openings, said bed separating the interior of said drum into a combustion region above the bed and a pyrolysis region defined by the bed, means for slowly rotating said drum so as to tumble and thus fluidize said sand, means for igniting waste material and the gas generated by pyrolysis of said waste material fed through said inlet opening and into said fluidized sand bed, and means for receiving ash and stack gas from said outlet opening.

2. The combination of claim 1 in which the cylindrical portion of said drum is defined by a water wall of adjacent pipes communicating with a source of water and an outlet for steam.

3. The combination of claim 1 including a plurality of baffles fixed to the inside of said drums for lifting sand as the drum rotates and then spilling the lifted sand through the combustion region above the sand bed.

4. The combination of claim 3 in which said baffles have small arcuate cross sections so that the coolest sand at the bottom of the bed is lifted for reheating and waste particles in said bed are not lifted therefrom.

5. The combination of claim 3 including a plurality of perforated air pipes disposed behind said baffles, and a manifold outside of said drum for selectively feeding additional air to said pipes when they pass through the sand bed.

6. The method of creating a heated fluidized bed for consuming burnable waste material by pyrolysis comprising the steps of rotating a bed of sand in a horizontal cylindrical drum, lifting and dropping sand from said bed through the open portion of said drum, and heating the region through which said sand is dropped.

7. A rotary combustor comprising, in combination, a cylindrical drum mounted for rotation about its axis, said drum being formed by a water wall of adjacent pipes communicating with a source of water and an outlet for steam, means defining a plurality of air passages perforated to the interior of said drum and spaced around the periphery of the drum, said air passages having open ends at one end of said drum, and a manifold at said one end of the drum opening to said air passages for feeding air to the passages adjacent the manifold as the drum rotates.

* * * * *